United States Patent
Sasaki et al.

(10) Patent No.: US 6,822,210 B2
(45) Date of Patent: Nov. 23, 2004

(54) DATA RECORDING APPARATUS INCLUDING LIGHT INTENSITY CONTROL DEVICE

(75) Inventors: Yoshio Sasaki, Tokorozawa (JP); Hiroyuki Tanaka, Tokorozawa (JP); Hiroyuki Uchino, Tokorozawa (JP); Tadashi Ueda, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 63 days.

(21) Appl. No.: 10/252,571

(22) Filed: Sep. 24, 2002

(65) Prior Publication Data

US 2003/0062466 A1 Apr. 3, 2003

(30) Foreign Application Priority Data

Oct. 1, 2001 (JP) ...................................... P2001-304910
Feb. 21, 2002 (JP) ...................................... P2002-044222

(51) Int. Cl.$^7$ ................................................. G01J 1/32
(52) U.S. Cl. .................... 250/205; 250/201.5; 369/116; 369/47.51; 369/53.26
(58) Field of Search .............................. 250/201.5, 205; 327/514; 369/116, 47.51–47.53, 53.26–53.27

(56) References Cited

U.S. PATENT DOCUMENTS 4,894,525 A    1/1990   Kakuta ....................... 250/205
5,537,383 A    7/1996   Gage et al. .................. 369/116
5,544,136 A    8/1996   Horie ......................... 369/44.34
6,490,302 B1 * 12/2002  Koishi et al. .............. 372/38.02
6,657,935 B2 * 12/2003  Eguchi et al. ............. 369/59.1

FOREIGN PATENT DOCUMENTS

| EP | 1 033 705 A2 | 9/2000 |
| JP | 5-21883 | 1/1993 |
| JP | 2000-21001 | 1/2000 |

* cited by examiner

Primary Examiner—Patrick J. Lee
(74) Attorney, Agent, or Firm—Morgan, Lewis & Bockius LLP

(57) ABSTRACT

A data recording apparatus includes a laser diode applying light to a recording medium to record data, a front monitor diode detecting the intensity of light emitted from the laser diode, a switch device for switching to the lowpass filter in the operating state during the time period over which a signal of 14T mark is recorded, a lowpass filter for receiving a signal which is outputted from a front monitor diode, and a sampling/holding unit sampling the output signal which is outputted from the lowpass filter. The intensity of light emitted from the laser diode on the output signal sampled by the sampling/holding unit.

12 Claims, 7 Drawing Sheets

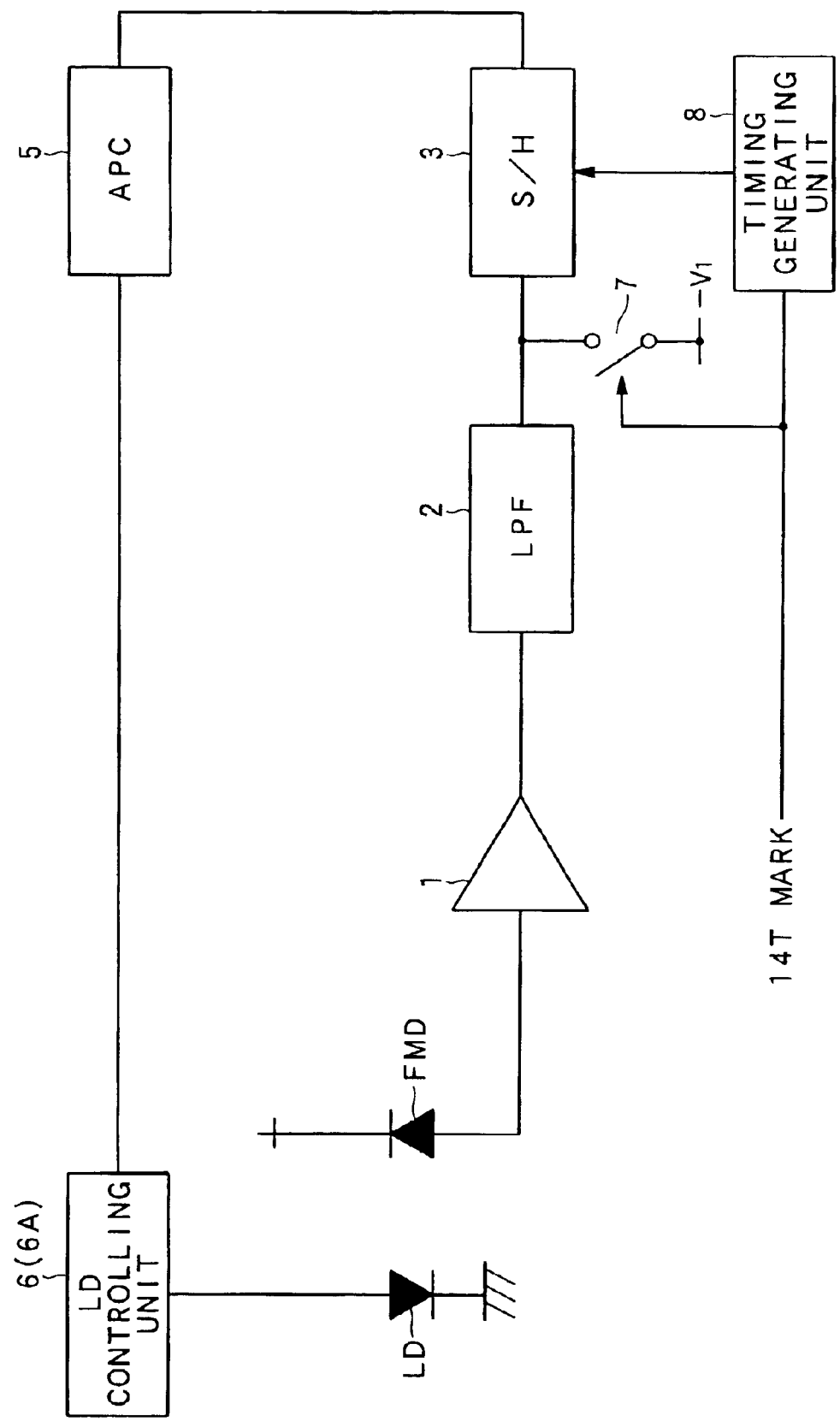

DATA RECORDING APPARATUS INCLUDING LIGHT INTENSITY CONTROL DEVICE

BACKGROUND OF THE INVENTION

1. Field of the Invention

The present invention relates to a technical field regarding a data recording apparatus exposing a data recording medium to light to record information, and particularly, to a data recording apparatus capable of controlling the intensity of light appropriately.

2. Description of the Related Art

In recent years, when a data recording medium (i.e. DVD-RW) in which data can be recorded/erased is exposed to laser light to carry out recording, two methods are employed for keeping the intensity of laser light constant. One of them is a method in which the temperature change of a laser diode emitting laser light is detected to supply an amount of current depending on the temperature change. The other is a method in which a front monitor for detecting the intensity of laser light is provided, and a detection signal from the front monitor is peak-held to perform control so that the peak value is kept constant.

In the former method, however, the emission efficiency of the laser diode that varies with the temperature is represented by typical values, and open control based on the typical value is performed. As a result, the variations in the characteristics of the laser diode are directly reflected as variations in the control of light intensity, thereby reducing the accuracy of light intensity. Particularly, it is one of the most crucial topics in the case of high-speed recording where light intensity has a significant influence on recording characteristics.

The above-discussed other method does not reduce the accuracy of light intensity because the peak hold capability can be used to perform feedback control. However, the circuit for peak hold has a large scale.

SUMMARY OF THE INVENTION

The object of the present invention is to provide a data recording apparatus, which is capable of accurately controlling the intensity of light applied to a data recording medium, and which can be manufactured at low costs because the circuit is made small.

The above object of present invention can be achieved by a data recording apparatus of the present invention. The apparatus is provided with: a photoirradiation device for applying light to a data recording medium to record data; a detection device for detecting the intensity of light emitted from the photoirradiation device; a lowpass filter for receiving a signal which is outputted from the detection device; a switch device for keeping the lowpass filter in the operating state during the time period over which a signal having a predetermined time duration is recorded; a sampling device for sampling a signal which is outputted from the lowpass filter; and a control device for controlling the intensity of light emitted from the photoirradiation device based on the signal sampled by the sampling device.

According to this data recording apparatus, the lowpass filter is made to go into operation during the time period over which a signal having a predetermined time duration is recorded, whereby the output signal outputted from the detection device can be extracted in predetermined timing related to the data, which is recorded in the data recording medium, to be provided for the lowpass filter.

Accordingly, only a detection signal reflecting light intensity correctly can be taken, for example, by extracting a portion of consecutive record marks, thus making it possible to accurately control the intensity of light emitted from the photoirradiation device. Also, according to this data recording apparatus, circuits for peak-holding and the like are not required, and therefore the scale of the circuit can be reduced, thus making it possible to reduce the costs associated with assembling the device.

In one aspect of the present invention, the data recording medium associated with the data recording apparatus is a rewritable recording medium in which recorded data is erased by the light emitted from the photoirradiation device, and the photoirradiation device records new data while erasing data recorded in the data recording medium.

In this case, the output signal outputted from the lowpass filter for erasing recorded data may be equal in level to the output signal outputted from the lowpass filter for recording new information. However, according to this data recording apparatus, the intensity of light emitted from the photoirradiation device can be reliably reflected in the output signal outputted from the lowpass filter, for example, by selectively extracting the detection signal of the sensor for recording new data, thus making it possible to control accurately the intensity of light emitted from the photoirradiation device.

In one aspect of the present invention, the photoirradiation device included in the data recording apparatus applies the light, which is lower in intensity than the light emitted when new data is recorded in the data recording medium, for erasing data recorded in the data recording medium.

In one aspect of the present invention, the apparatus is further provided with a band switching device for switching the filter band of the lowpass filter according to the data recording rate to record the data for the data recording medium.

In this case, the filter band of the lowpass filter is switched in accordance with the data recording rate, and therefore a very suitable output signal outputted from lowpass filter can be obtained even if the recording rate is changed, thus making it possible to accurately control the intensity of light emitted from the photoirradiation device.

The above object of present invention can be achieved by a data recording apparatus of the present invention. The apparatus is provided with: a photoirradiation device for applying light to a data recording medium to record data; a detection device for detecting the intensity of light emitted from the photoirradiation device; a lowpass filter for receiving a signal which is outputted from the detection device; a sampling device for sampling a signal which is outputted from the lowpass filter; a control device for controlling the intensity of light emitted from the photoirradiation device based on the signal sampled by the sampling device; and a band switching device for switching the filter band of the lowpass filter according to the data recording rate to record the data for the data recording medium.

According to this data recording apparatus, the filter band of the lowpass filter is switched according to the data recording rate in the data recording medium, and therefore an appropriate output signal outputted from the lowpass filter can always be obtained even if the recording rate varies, thus making it possible to control accurately the intensity of light emitted from the photoirradiation device.

Also, according to this data recording apparatus, circuits for peak-holding and the like are not required, and therefore the scale of the circuit can be reduced, thus making it possible to reduce the costs associated with assembling the device.

The above object of present invention can be achieved by a data recording apparatus of the present invention. The apparatus is provided with: a photoirradiation device for applying light to a data recording medium to record data; a detection device for detecting the intensity of light emitted from the photoirradiation device; a lowpass filter for receiving a signal which is outputted from the detection device; a sampling device for sampling a signal which is outputted from the lowpass filter; a control device for controlling the intensity of light emitted from the photoirradiation device based on the signal sampled by the sampling device; and a sampling timing switching device for switching the sampling timing of the sampling device according to the data recording rate to record the data for the data recording medium.

According to this data recording apparatus, the sampling timing of sampling device is switched according to the data recording rate to record the data for the data recording medium, and therefore the output signal outputted from the lowpass filter can appropriately be sample at all time even if the recording rate varies, thus making it possible to control accurately the intensity of light emitted from the photoirradiation device. Also, according to this data recording apparatus, circuits for peak-holding and the like are not required, and therefore the scale of the circuit can be reduced, thus making it possible to reduce the costs associated with assembling the device.

In one aspect of the present invention, the apparatus is further provided with a band switching device for switching the filter band of the lowpass filter according to the data recording rate to record the data for the data recording medium.

In this case, the sampling timing of sampling device is switched in accordance with the filter band of the lowpass filter, whereby the output signal outputted from the lowpass filter can be sampled in a low-waviness area.

In one aspect of the present invention, the sampling device included in the data recording apparatus samples the signal which is outputted from the lowpass filter at a point of time before the signal which is outputted from the lowpass filter converges to a predetermined level.

In this case, the output signal outputted from the lowpass filter can be sampled in the low-waviness area included in the output signal outputted from the lowpass filter, and therefore the output signal outputted from the lowpass filter can be accurately sampled, thus making it possible to accurately control the intensity of light emitted from the photoirradiation device.

BRIEF DESCRIPTION OF THE DRAWINGS

FIG. 1 is a block diagram showing the configuration of a photoirradiation controlling unit in the data recording apparatus of the first embodiment of the present invention;

DETAILED DESCRIPTION OF THE PREFERRED EMBODIMENTS

First Embodiment

Figure 2A:
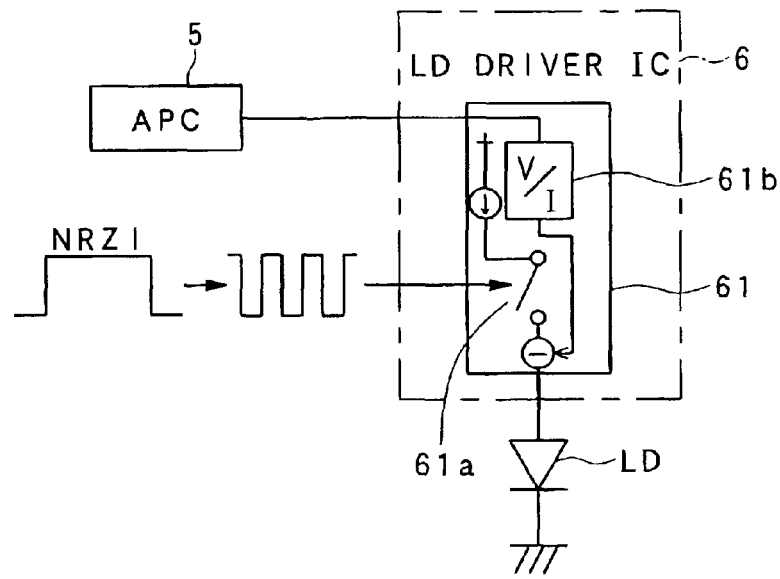
FIG. 2A is a block diagram showing the configuration of the laser diode controlling unit of the first embodiment in the analog mode.

The first embodiment of the data recording apparatus of the present invention will be described below with reference to FIGS. 1 to 4. FIG. 1 is a block diagram showing the configuration of a photoirradiation controlling unit in the data recording apparatus of the first embodiment, FIG. 2 is a block diagram showing the configuration of a laser diode controlling unit, FIG. 3 shows the waveform of currents supplied to a laser diode, and FIG. 4 is a timing chart showing the waveform of each portion of the data recording apparatus.

As shown in FIG. 1, the data recording apparatus of the first embodiment comprises a laser diode LD applying laser light to an optical disk (not shown), a front monitor diode FMD detecting the intensity of light emitted from the front exit side of the laser diode LD, a head amplifier 1 amplifying the detection signal of the front monitor diode FMD, a lowpass filter 2 constituted by a primary passive circuit receiving the output signal of the head amplifier 1, a sampling/holding unit 3 sampling and holding the output signal of the lowpass filter 2, a voltage controlling unit 5 in which the output voltage is set based on the sampling value outputted from the sampling/holding unit 3, and a laser diode controlling unit 6 controlling the value of current supplied to the laser diode LD based on the output voltage of the voltage controlling unit 5.

A semiconductor switch 7 switching operation and non-operation of the lowpass filter 2 is connected to the output of the lowpass filter 2, and a signal of a timing generating unit 8 generating timing for sampling is inputted in the sampling/holding unit 3. Furthermore, for a detailed description of the optical system required for applying the laser light emitted from the laser diode LD to an optical disk, see Japanese Patent Application Laid-Open No. 2000-21001.

Figure 2B:
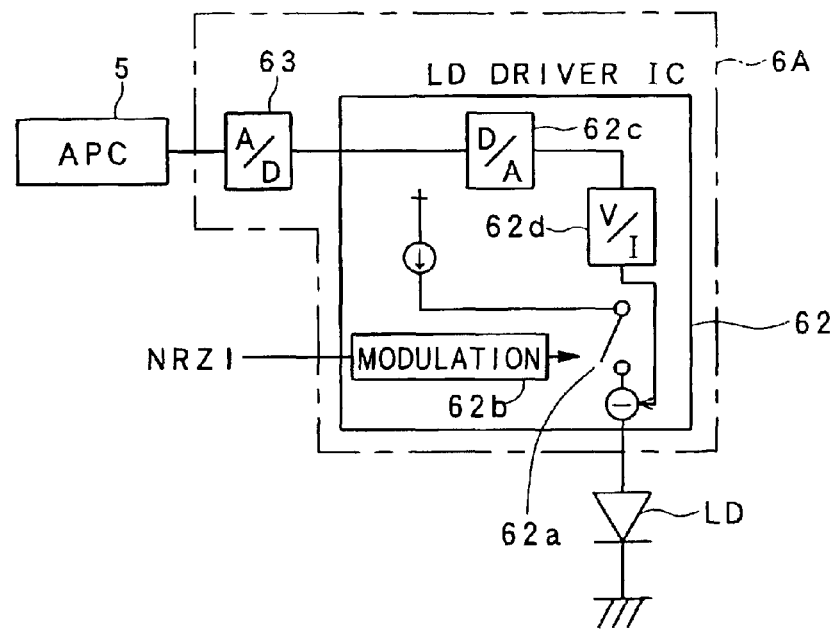
FIG. 2B is a block diagram showing the configuration of the laser diode controlling unit of the first embodiment in the digital mode.

FIGS. 2A and 2B show laser diode controlling units 6 configured in analog mode and digital mode, respectively. In the example of FIG. 2A, the laser diode controlling unit 6 comprises a laser diode driver IC61 having a switch portion 61*a* switching in response to a write signal and a voltage/current converting portion 61*b* supplying a current to the laser diode LD based on the voltage of the output signal of the voltage controlling unit 5. The write signal is generated based on a NRZI (non-return-to-zero-inverted recording)

signal, and is inputted to the switch portion 61a. In the configuration of FIG. 2A, the current provided through the switch portion 61a from the constant current source is added to the current outputted from the voltage/current converting portion 61b, and is then supplied to the laser diode LD.

On the other hand, in the example of FIG. 2B, the laser diode controlling unit 6A comprises a laser driver IC62 and a microcomputer 63 receiving the output signal of the voltage controlling unit 5. The driver IC62 comprises a switch portion 62a switching in response to a write signal, a modulation portion 62b generating the write signal based on the NRZI signal, a D/A converting portion 62c converting a serial signal from the microcomputer 63 to an analog signal voltage, and a voltage/current converting portion 62d supplying a current of predetermined value to the laser diode LD based on the analog signal voltage from the D/A converting portion 62c.

Then, the microcomputer 63 carries out analog/digital conversion of the output signal of the voltage controlling unit 5, and outputs the output signal to the D/A converting portion 62c of the driver IC62. The output voltage value of the D/A converting portion 62c is converted into the current value at the voltage/current converting portion 62d. In the configuration of FIG. 2B, the current provided through the switch portion 62a from the constant current source is added to the current outputted from the voltage/current converting portion 62d, and is then supplied to the laser diode LD.

Figure 3A:
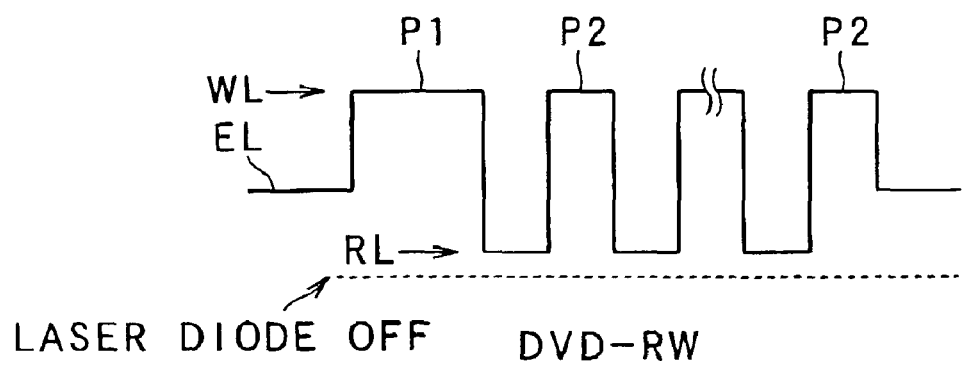
FIG. 3A shows the waveform of currents supplied to a laser diode of the first embodiment in the analog mode.
Figure 3B:
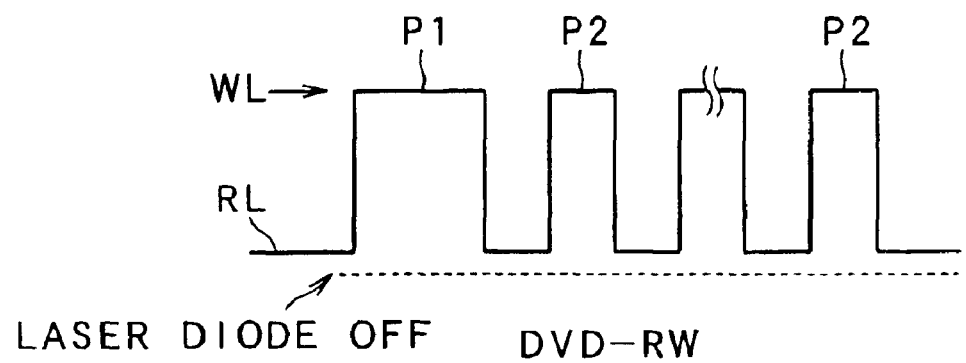
FIG. 3B shows the waveform of currents supplied to the laser diode of the first embodiment in the digital mode.

FIG. 3A illustrates the waveform of the write signal in FIGS. 2A and 2B. FIG. 3A shows a write signal when new data is written in DVD-RW while recorded data in DVD-RW is erased. Erase level EL in FIG. 3A is a level when the data recorded on a part, which does not form a record mark in DVD-RW, is eliminated. Furthermore, in the example of FIG. 3A, a wide top pulse P1 of write level WL and a narrow top pulse string P2 undergoing a shift between the write level WL and the read level RL are arranged in the area in which new data is written, and the length of the record mark (3T to 14T) formed in the disk is controlled by changing the number of pulses (0 to 11) in the pulse string P2.

Operations of the data recording apparatus of the first embodiment will now be described.

Figure 4A:
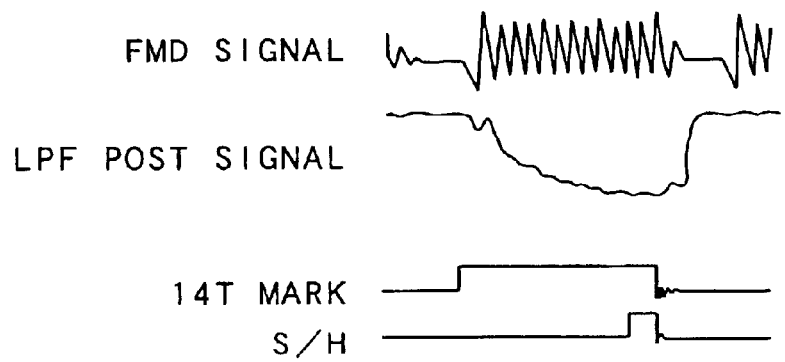
FIG. 4A is a timing chart showing the waveform of each portion of the data recording apparatus of the first embodiment.

When the laser diode ID emits light, and the light is applied to the disk, a record mark consistent with the applied light is formed on the disk. As shown in FIG. 4A as "FMD signal", the luminous intensity of the laser diode LD is constantly detected by the front monitor diode FMD. The output signal of the front monitor diode FMD is amplified by the head amplifier 1 and inputted to the lowpass filter 2, and the operation/non-operation of the lowpass filter 2 is switched by the switch 7.

A 14T mark undergoing a change in state in timing, in which a signal having a predetermined time duration is recorded (record mark with length of 14T, namely synchronizing signal according to this embodiment), is inputted in the switch 7 as shown in FIG. 1. Accordingly, the switch 7 is in the off-state, and the lowpass filter 2 is set at the operation state while the synchronized signal is written in. Furthermore, the reason why the synchronizing signal is selected as a signal having a predetermined time duration is that the signal is longest in write signals, and the output signal of the lowpass filter 2 converges, and that the synchronizing signal is absolutely generated at a predetermined interval, thus making it possible to control stably the emission of light from the laser diode LD as described later. During a time period excluding the time period over which the synchronizing signal is written, namely during the time period over which recorded data is erased, and the time period over which record marks having lengths other than 14T are written, the switch 7 is constantly in the on-state, and the lowpass filter 2 is set at the non-operation state with the output of the lowpass filter 2 being consistent with the signal level ($-V_1$) obtained when laser light with the read level of RL is applied.

As shown as "LPF post signal" in FIG. 4A, the output signal of the lowpass filter 2 converges from the level of $-V_1$ toward a fixed value in the negative direction during a time period over which the lowpass filter 2 is operated. Furthermore, the shift of the output signal in the negative direction is due to the fact that the head amplifier 1 is comprised of an inverting circuit. After the expiration of a predetermined time period from the startup of the 14T mark, a timing signal shown as 'S/H' in FIG. 4A is outputted from the timing generating unit 8 to the sampling/holding unit 3, and the timing signal outputted from the timing generating unit 8 is sampled in the sampling/holding unit 3 in synchronization with the "H" period of this signal, and this sampled value is held during the "L" period of the S/H signal.

Then, the voltage controlling unit 5 generates a predetermined voltage based on the sampled value sampled in the sampling/holding unit 3, and this voltage is inputted to the laser diode controlling unit 6. The laser diode controlling unit 6 feedback-controls the current to be supplied to the laser diode LD based on the voltage of this voltage controlling unit 5, thereby performing control so that the luminous intensity of the laser diode LD is kept constant.

In this way, in the first embodiment, the lowpass filter 2 is operated only during the time period over which the record mark with the length of 14T, whereby only the detection signal of the front monitor diode FMD during this time period is extracted, thus making it possible to detect correctly and control the intensity of light emitted from the laser diode LD.

Figure 4B:
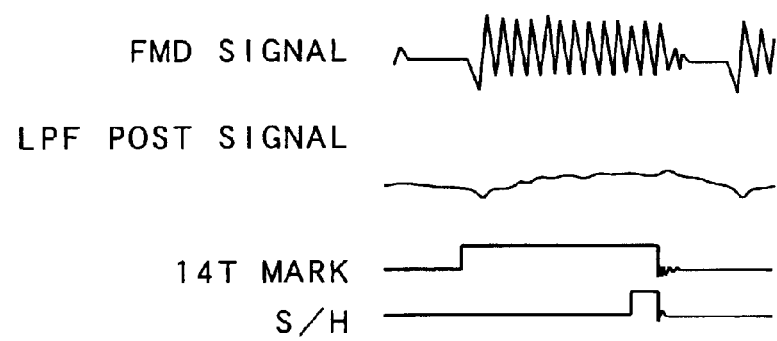
FIG. 4B is a timing chart showing the waveform of each portion of the data recording apparatus of the first embodiment when a lowpass filter is constantly operated.

This feature will be described more specifically with regard to FIGS. 4B and 4C. FIG. 4B shows each waveform of FIG. 4A in a similar sequence with respect to the case where the lowpass filter 2 is constantly operated. In the case where the lowpass filter 2 is constantly operated, as shown in FIG. 4B, the difference between the luminous intensity of the laser diode LD kept at the erase level and the luminous intensity of the laser diode LD in the write state Is not significant with respect to the output signal of the lowpass filter 2. In other words, as shown in the waveform of the output signal of the lowpass filter 2 in FIG. 4B, the level of the output signal of the lowpass filter 2 at the time when the record mark with the length of 14T is written is not significantly different from the signal levels before and after the record mark is written. Therefore, it is difficult to detect the luminous intensity of the laser diode LD based on the level of the output signal of the lowpass filter 2 and to control the same.

Figure 4C:
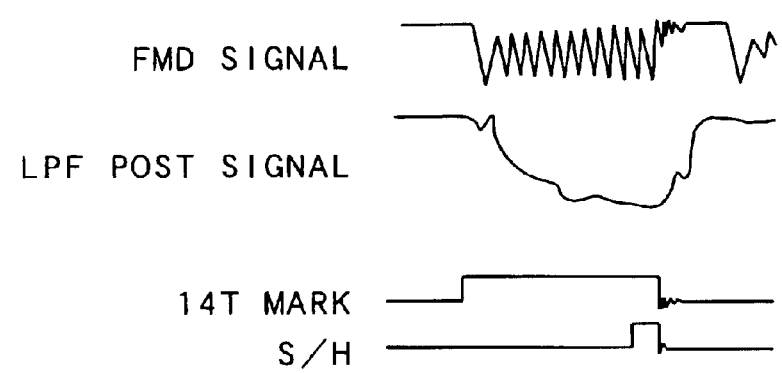
FIG. 4C is a timing chart showing the waveform of each portion of the data recording apparatus of the first embodiment when it is not necessary to apply laser light for erase.

Furthermore, as shown in FIG. 4C, it can be understood that if it is not necessary to apply laser light for erasing as in the case of writing in DVD-R, unlike in DVD-RW, the level of the output signal of the lowpass filter 2 changes in accordance with the timing in which the record mark with the length of 14T is written, and therefore the luminous intensity of the laser diode LD can be detected based on the output signal of the lowpass filter 2 as in the case of this embodiment, thus making it possible to detect the luminous intensity of the laser diode LD even if the configuration of this embodiment is not applied. Furthermore, FIG. 4C also shows each waveform shown in FIG. 4A in similar sequence.

In this embodiment, as described above, the lowpass filter 2 is operated only when the record mark with the length of 14T is written, and therefore the luminous intensity of the laser diode LD can be reflected correctly in the output signal of the lowpass filter 2. Thus, the luminous intensity of the laser diode LD can be controlled with high accuracy. In addition, according to this embodiment, circuits for peak holding and the like are not required, and therefore the scale of the circuit can be reduced, thus making it possible to reduce costs associated with assembling the device.

Furthermore, according to the first embodiment described above, the lowpass filter 2 is operated during the time period over which the synchronizing signal is written, but the lowpass filter 2 may also be operated during the time period over which a signal of other length such as the record mark of 11T in write signals is written, as a matter of course. In addition, the lowpass filter 2 may be operated not only during the time period over which a record mark of certain length is written but also during the time period over which record marks of different lengths such as the record mark of 11T and the record mark of 14T are written. In addition, the front monitor diode FMD is used as detection device for detecting the luminous intensity of the laser diode LD, but a back monitor diode BMD detecting the intensity of light emitted from the rear exit side of the laser diode LD may also be used as described in Japanese Patent Application Laid-Open No. 05-21883.

Second Embodiment

The second embodiment of the data recording apparatus of the present invention will now be described with reference to FIGS. 5 to 7. The data recording apparatus of the second embodiment is an apparatus applied for writing data to a DVD-R, which is a data recording medium in which only addition of data is possible.

Figure 5:
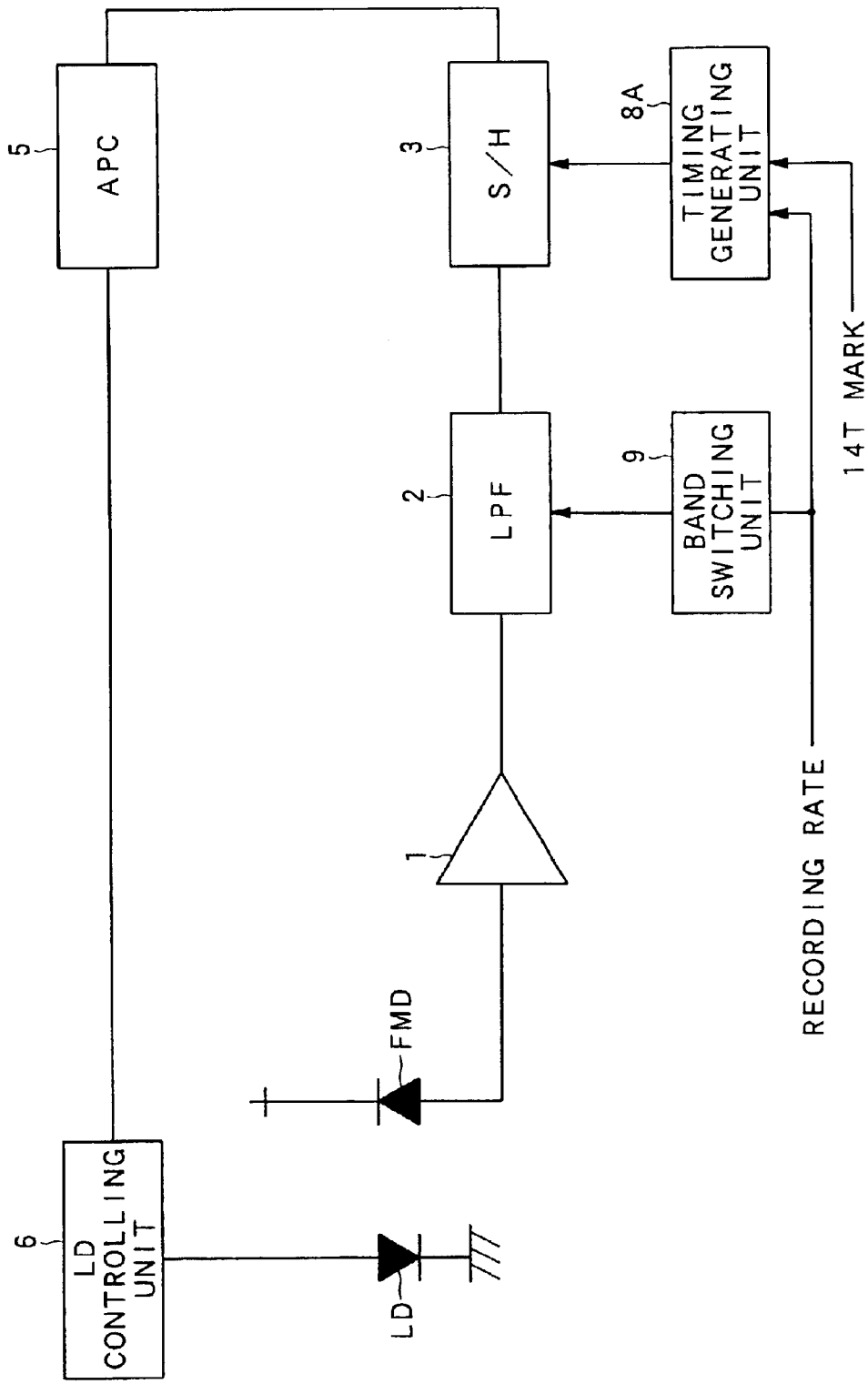
FIG. 5 is a block diagram showing the configuration of the photoirradiation controlling unit in the data recording apparatus of the second embodiment of the present invention.
Figure 6A:
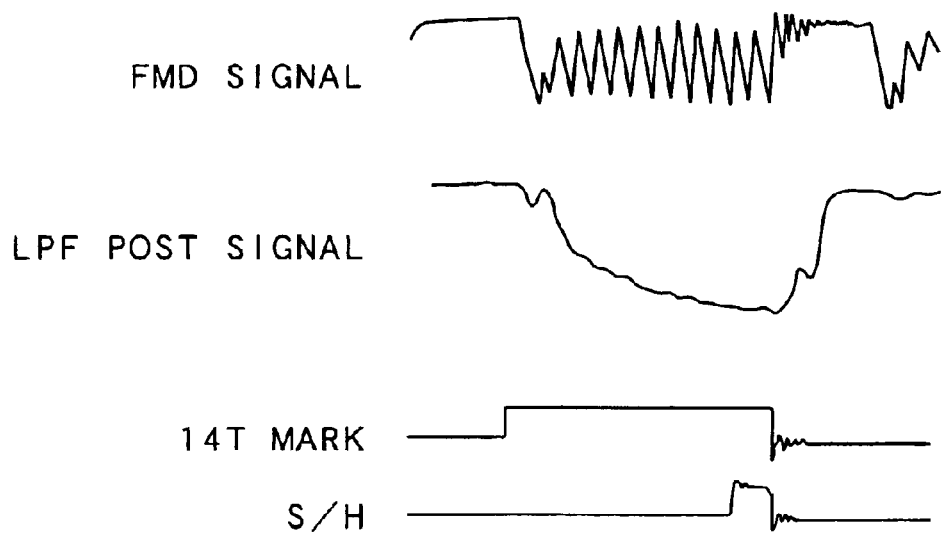
FIG. 6A is a timing chart showing the waveform of each portion of the data recording apparatus of the second embodiment when the filter is set at the filter band for the single recording rate.
Figure 6B:
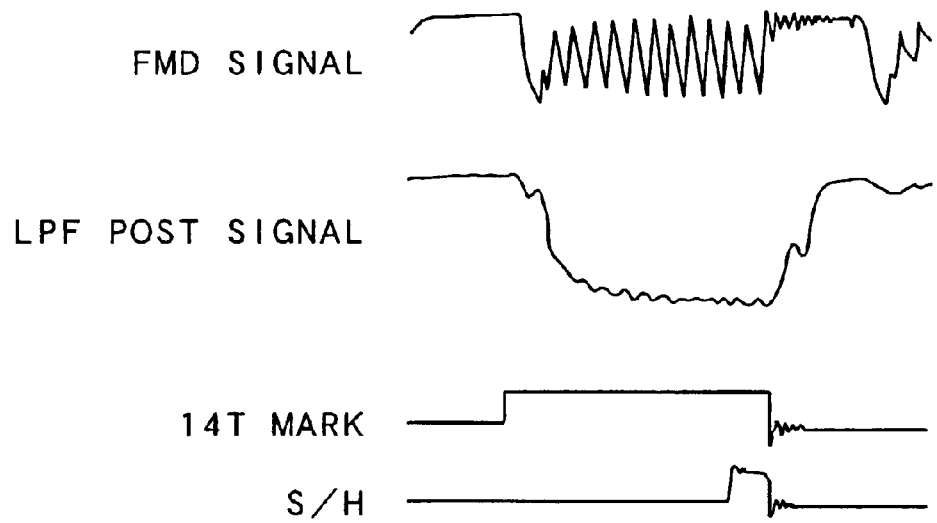
FIG. 6B is a timing chart showing the waveform of each portion of the data recording apparatus of the second embodiment when the filter is set at the filter band for the double recording rate.
Figure 7:
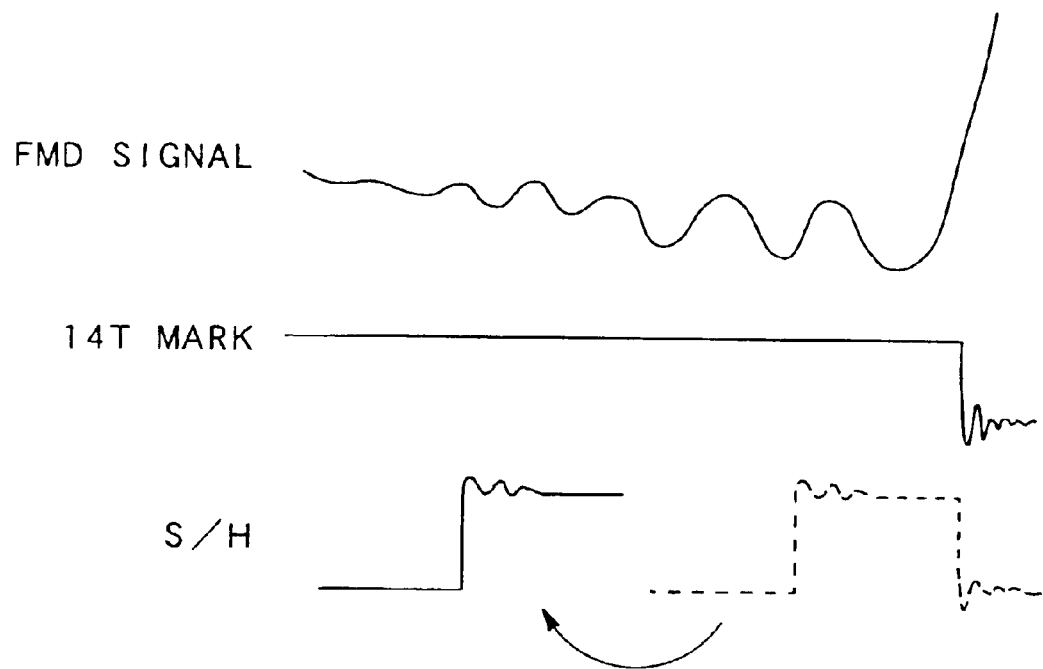
FIG. 7 is a timing chart showing another waveform of each portion of the data recording apparatus of the second embodiment when the filter is set at the filter band for the single recording rate.

FIG. 5 is a block diagram showing the configuration of a photoirradiation controlling unit in the data recording apparatus of the second embodiment, FIG. 6 is a timing chart showing the waveform of each portion of the apparatus, and FIG. 7 is a timing chart showing another example of operation. Furthermore, elements same as those in the first embodiment will be given same symbols, and descriptions thereof will not be presented.

As shown in FIG. 5, the data recording apparatus of the second embodiment comprises a band switching unit 9 for switching the filter band of the lowpass filter 2. Signals outputted from a timing generating unit 8A are inputted to the sampling/holding unit 3.

As shown in FIG. 5, the data recording rate (record transfer rate) is inputted to the band switching unit 9 and the timing generating unit 8A, respectively. In addition, the 14T mark is inputted to the timing generating unit 8A during the time period over which the record mark with the length of 14T is written.

In the data recording apparatus of the second embodiment, the recording rate (e.g. single or double) can be switched, and the filter band of the lowpass filter 2 is switched according to this recording rate. In addition, the sampling timing in the sampling/holding unit 3 is switched so that the output signal of the lowpass filter 2 can be sampled correctly in response to the switching of the filter band of the lowpass filter 2.

In this way, by switching simultaneously the filter band of the lowpass filter 2 and the sampling timing in the sampling/holding unit 3 according to the recording rate, operations for detecting the luminous intensity of the laser diode LD can always be kept in a suitable state even if there is variation in the recording rate. Therefore, the luminous intensity of the laser diode LD can be controlled with high accuracy independently of the recording rate.

Instead of switching simultaneously the filter band of the lowpass filter 2 and the sampling timing in the sampling/holding unit 3, any one of them may be switched.

Furthermore, as a phenomenon clearly emerging especially when the lowpass filter 2 is set at the filter band for high speed, a waviness originating from the output signal of the original laser diode LD is included in the output signal of the lowpass filter 2. Therefore, by switching the filter band, and setting the sampling timing at timing in which this waviness is reduced, the luminous intensity of the laser diode LD can be more accurately detected and controlled.

FIG. 6A shows the waveform of each portion of the apparatus when the filter is set at the filter band for single recording rate in the case of single recording rate, and FIG. 6B shows the waveform of each portion of the apparatus when the filter is set at the filter band for double recording rate in the case of single recording rate.

Here, the output waveform of the lowpass filter 2 shown in FIG. 6B has a waviness of a larger amplitude than that of FIG. 6A, and thus makes it impossible to correctly detect the luminous intensity of the laser diode LD due to the influence of the waviness if the sampling timing is set in the same manner as FIG. 6A.

Therefore, as shown in FIG. 7, by shifting the sampling timing to an earlier point of time than the case of FIG. 6A, the output signal of the lowpass filter 2 can be sampled in timing in which the waviness is reduced to a smaller level, thus making it possible to accurately detect and control the luminous intensity of the laser diode LD. Furthermore, in FIG. 7, the timing signal (S/H) associated with FIG. 6A is shown by a dotted line, and the timing signal (S/H) after shifting the timing to an earlier point of time is shown by a solid line.

Also, as shown in FIG. 7, the amplitude of the waviness included in the output signal of the lowpass filter 2 is small before the output signals of the lowpass filter 2 starts to converge to a certain fixed value. In this way, the practice of sampling the output signal of the lowpass filter 2 at the time when the waviness of the lowpass filter 2 is small, and the practice of switching the filter band of the lowpass filter according to the recording rate may be adopted not only in the second embodiment but also in the first embodiment and other cases.

Furthermore, the present invention should not be limited to the above described embodiments. For example, DVD-RW is used as the data recording medium according to the first embodiment, but other recording media such as DVD-RAM and CD-RW may be used as a matter of course.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-304910, filed on Oct. 1, 2001, and of Japanese Patent Application No. 2002-44222, filed on Feb. 21, 2002, including the specifications, claims, drawings and summaries are incorporated herein by reference in their entireties.

What is claimed is:

1. A data recording apparatus comprising:
   a photoirradiation device for applying light to a data recording medium to record data;
   a detection device for detecting the intensity of light emitted from said photoirradiation device;

a lowpass filter for receiving a signal which is outputted from said detection device;

a switch device for keeping said lowpass filter in the operating state during the time period over which a signal having a predetermined time duration is recorded;

a sampling device for sampling a signal which is outputted from said lowpass filter; and a control device for controlling the intensity of light emitted from said photoirradiation device based on the signal sampled by said sampling device.

2. The data recording apparatus according to claim 1, wherein said data recording medium is a rewritable recording medium in which recorded data is erased by the light emitted from said photoirradiation device, and said photoirradiation device records new data while erasing data recorded in said data recording medium.

3. The data recording apparatus according to claim 2, wherein said photoirradiation device applies the light, which is lower in intensity than the light emitted when new data is recorded in said data recording medium, for erasing data recorded in said data recording medium.

4. The data recording apparatus according to claim 1, further comprising a band switching device for switching the filter band of said lowpass filter according to the data recording rate to record the data for said data recording medium.

5. The data recording apparatus according to claim 2, further comprising a band switching device for switching the filter band of said lowpass filter according to the data recording rate to record the data for said data recording medium.

6. The data recording apparatus according to claim 3, further comprising a band switching device for switching the filter band of said lowpass filter according to the data recording rate to record the data for said data recording medium.

7. A data recording apparatus comprising:

a photoirradiation device for applying light to a data recording medium to record data;

a detection device for detecting the intensity of light emitted from said photoirradiation device;

a lowpass filter for receiving a signal which is outputted from said detection device;

a sampling device for sampling a signal which is outputted from said lowpass filter, a control device for controlling the intensity of light emitted from said photoirradiation device based on the signal sampled by said sampling device; and a band switching device for switching filter band of said lowpass filter according to the data recording rate to record the data for said data recording medium.

8. A data recording apparatus comprising:

a photoirradiation device for applying light to a data recording medium to record the data;

a detection device for detecting the intensity of light emitted from said photoirradiation device;

a lowpass filter for receiving a signal which is outputted from said detection device;

a sampling device for sampling a signal which is outputted from said lowpass filter;

a control device for controlling the intensity of light emitted from said photoirradiation device based on the signal sampled by said sampling device; and a sampling timing switching device for switching the sampling timing of said sampling device according to the data recording rate to record the data for said data recording medium.

9. The data recording apparatus according to claim 8, comprising a band switching device for switching the filter band of said lowpass filter according to the data recording rate to record the data for said data recording medium.

10. The data recording apparatus according to claim 1, wherein said sampling device samples the signal which is outputted from said lowpass filter at a point of time before the signal which is outputted from said lowpass filter converges to a predetermined level.

11. The data recording apparatus according to claim 7, wherein said sampling device samples the signal which is outputted from said lowpass filter at a point of time before the signal which is outputted from said lowpass filter converges to a predetermined level.

12. The data recording apparatus according to claim 8, wherein said sampling device samples the signal which is outputted from said lowpass filter at a point of time before the signal which is outputted from said lowpass filter converges to a predetermined level.

* * * * *